No. 720,177. PATENTED FEB. 10, 1903.
C. W. PETRO.
RUNNING GEAR.
APPLICATION FILED OCT. 2, 1902.
NO MODEL. 2 SHEETS—SHEET 1.
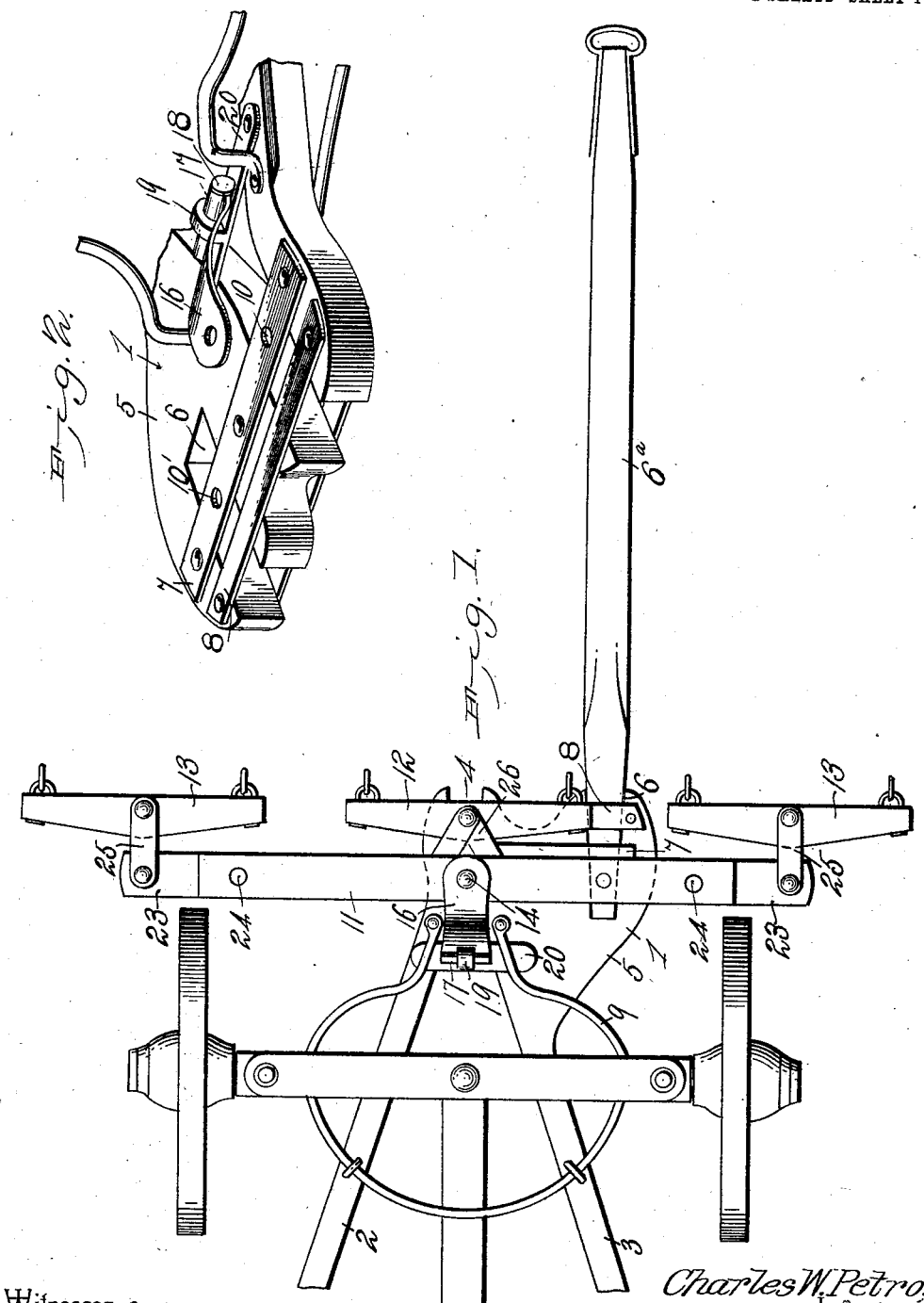
Witnesses
Charles W. Petro, Inventor.
by C. A. Snow & Co.
Attorneys

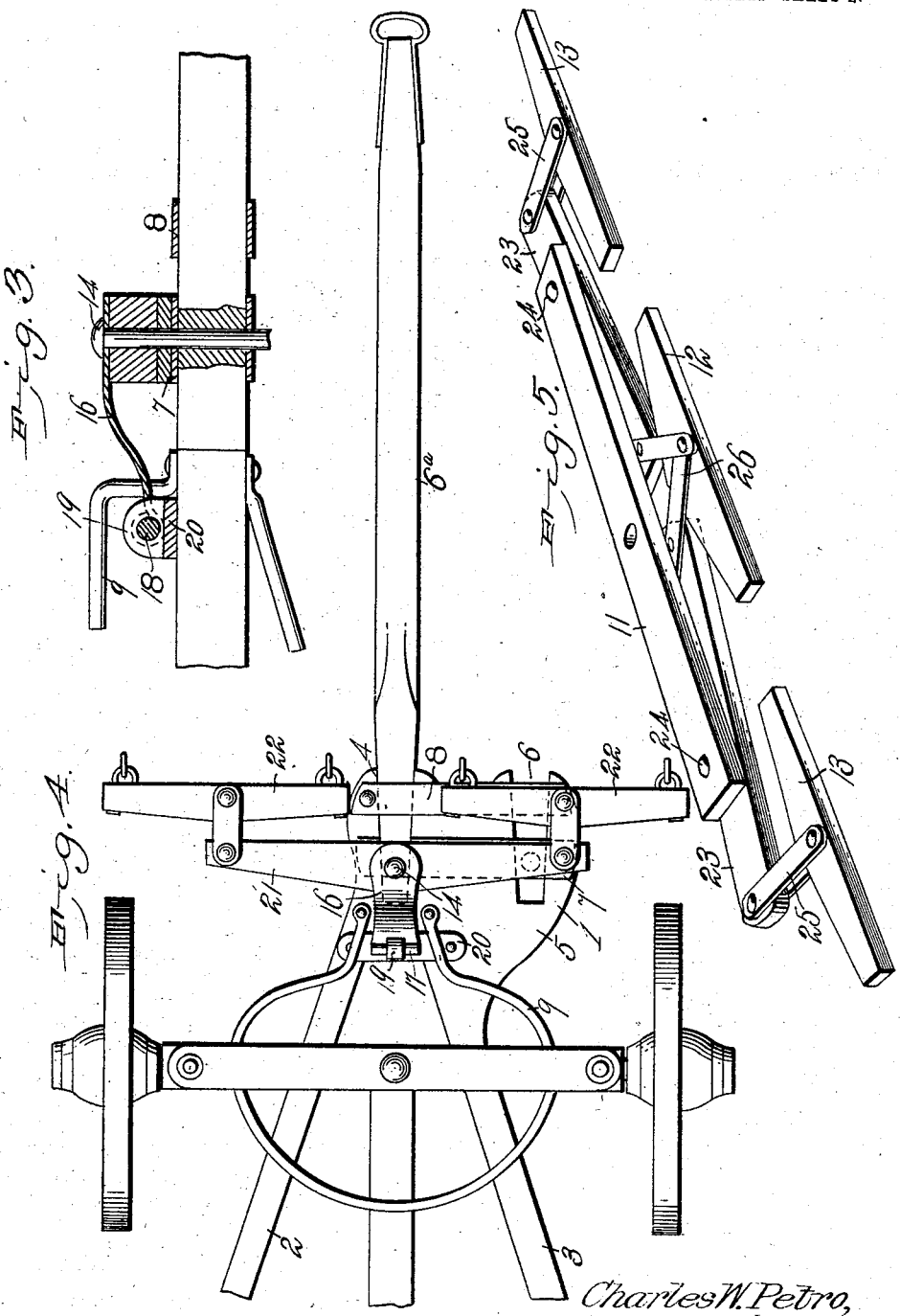

UNITED STATES PATENT OFFICE.

CHARLES W. PETRO, OF NEAR NORTH SALEM, INDIANA.

RUNNING-GEAR.

SPECIFICATION forming part of Letters Patent No. 720,177, dated February 10, 1903.

Application filed October 2, 1902. Serial No. 125,677. (No model.)

*To all whom it may concern:*

Be it known that I, CHARLES W. PETRO, a citizen of the United States, residing near North Salem, in the county of Putnam and State of Indiana, have invented a new and useful Running-Gear, of which the following is a specification.

The invention relates to improvements in running-gear for vehicles.

The object of the present invention is to improve the construction of running-gear for vehicles and to provide a simple, inexpensive, and efficient construction of great strength, adapted to permit either two or three horses to be hitched to a wagon or other vehicle and capable of enabling the pole or tongue to be centrally arranged when two horses are used and of permitting the said pole or tongue to be shifted laterally when three horses are used and to be arranged between the central horse and one of the side horses, whereby all side draft is prevented.

The invention consists in the construction and novel combination and arrangement of parts, hereinafter fully described, illustrated in the accompanying drawings, and pointed out in the claims hereto appended.

In the drawings, Figure 1 is a plan view of a portion of a running-gear constructed in accordance with this invention and shown arranged for three horses. Fig. 2 is a perspective view of the front portion of the front truck, illustrating the arrangement of the pole and of the tongue or pole sockets. Fig. 3 is a detail sectional view of the same. Fig. 4 is a plan view, the running-gear being arranged for two horses. Fig. 5 is a detail perspective view of the tripletree.

Like numerals of reference designate corresponding parts in all the figures of the drawings.

1 designates the front portion or front truck of a running-gear which is provided with front hounds 2 and 3, secured to the front axle in the usual manner and having their front ends spaced apart to provide a centrally-arranged tongue or pole receiving socket 4. The front hound 3 is provided with a lateral enlargement 5, having a tongue or pole receiving socket 6, offset laterally from the centrally-arranged socket 4 and adapted to receive a tongue or pole 6ª to permit the same to be arranged at one side of the center between the central horse and the right-side horse when three horses are hitched to the running-gear. In Figs. 1 and 2 of the drawings the lateral extension is shown at the right-hand side of the running-gear; but it will be readily apparent that it may be arranged either at the right or left hand side, as desired. This permits a central draft and effectually prevents all side draft, and there is no liability of the central animal being chafed or irritated by the tongue or pole. The lateral extension or enlargement of the front hound 3 may be formed integral with the said hound or be constructed in any other desired manner, and the front portion of the running-gear is supported by transverse straps or bars 7 and 8, arranged in pairs and secured to the upper and lower faces of the hounds by bolts or other suitable fastening devices. The hounds are also supported by a curved brace-rod 9, extending in advance and in rear of the axle, as clearly shown in the drawings. The transverse straps or bars 7 are provided with perforations 10 and 10', adapted to receive pins or bolts for securing the tongue or pole to the running-gear and for connecting the whiffletrees to the same. The whiffletree or tripletree 11, which may be constructed in any desired manner, is provided with central and end singletrees 12 and 13, located at the center of the front portion of the running-gear and at opposite sides thereof and adapted to permit the central horse to walk in the middle of the road. The pin or bolt 14 for securing the whiffletrees to the running-gear is supported by a brace 16, consisting of a strap or bar having a bifurcated rear end and provided at opposite sides of the bifurcations with eyes 17 for the reception of a pintle 18, which hinges the brace 16 to a perforated gear 19 of a plate or bar 20. The plate or bar 20 is secured to the upper faces of the hounds and serves to support the same.

When it is desired to arrange the running-gear to enable two horses to be hitched to it, the pole or tongue is transferred from the side socket to the central socket or opening 4 and the whiffletree 11 is removed and a doubletree 21 is substituted for the same. The pin 14 passes through the doubletree and through the end of the pole when the parts are arranged as shown in Fig. 4. The doubletree is composed of a bar and is connected by straps to singletrees 22.

The whiffletree 11 is composed of a pair of bars spaced apart to receive levers 23, pivoted near their outer ends by bolts 24 or other suitable fastening devices to the whiffletree and extending beyond the ends of the same. The singletrees 13 are secured to the outer ends of the levers by straps 25, and the central singletree 12 is connected with the inner ends of the levers by straps 26, arranged in pairs and converging forwardly from the said levers. The inner arms of the levers are twice the length of the outer arms to equalize the draft between the horses or other draft-animals.

It will be seen that the running-gear is exceedingly simple and inexpensive in construction and that it is adapted to permit the pole or tongue to be arranged either centrally of it or at one side of the same, to locate it between the horses when a doubletree is used and to arrange it between the central horse and one of the side horses when a tripletree is employed. Furthermore, it will be clear that when three horses are used the draft is centrally of the vehicle and that the arrangement of the pole at one side effectually prevents all side draft.

What is claimed is—

1. The combination with a running-gear for wagons provided at its front with a pair of tongue-receiving sockets located respectively at the center and side of the same, said sockets being alike in size and contour, of a tongue having its end formed to fit both of said sockets and adapted to be removably secured in either of them; whereby the tongue may be readily changed from one socket to the other to secure either a central or side draft.

2. In a wagon running-gear, the combination with front hounds spaced apart to form a tongue-receiving socket, one of said hounds having its end enlarged, and a tongue-receiving socket formed in its enlarged portion, said sockets being alike in size and contour, of a tongue having its end formed to fit both of said sockets and adapted to be removably secured in either of them; whereby the tongue may be readily changed from one socket to the other to secure either a central or side draft.

3. In a wagon running-gear, the combination with a pair of front hounds spaced apart and having their adjacent faces shaped to form a tongue-receiving socket, one of said hounds having its end enlarged and a tongue-receiving socket formed in its enlarged end, said sockets being alike in size and contour, of straps connecting the hounds and forming the upper and lower walls of the tongue-receiving sockets, and a tongue having its end formed to fit both of said sockets and adapted to be removably secured in either of them; whereby the tongue may be readily changed from one socket to the other to secure either a central or side draft.

In testimony that I claim the foregoing as my own I have hereto affixed my signature in the presence of two witnesses.

CHARLES W. PETRO.

Witnesses:
ROSCOE SMYTHE,
NOAH H. BARTLETT.